(12) United States Patent
Kalandek et al.

(10) Patent No.: US 10,399,534 B2
(45) Date of Patent: Sep. 3, 2019

(54) DRIVER AIRBAG MODULE AND BAG WITH PASSIVELY VENTED CUSHION

(71) Applicant: Key Safety Systems, Inc., Sterling Heights, MI (US)

(72) Inventors: Bruce A Kalandek, Dearborn, MI (US); John Musiol, West Bloomfield, MI (US); Mutaz Shkoukani, Macomb, MI (US); Marina Elias, Shelby Township, MI (US); Rasoul Moradi, Shelby Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 57 days.

(21) Appl. No.: 15/526,750

(22) PCT Filed: Nov. 13, 2015

(86) PCT No.: PCT/US2015/060551
§ 371 (c)(1),
(2) Date: May 13, 2017

(87) PCT Pub. No.: WO2016/077680
PCT Pub. Date: May 19, 2016

(65) Prior Publication Data
US 2017/0334389 A1 Nov. 23, 2017

Related U.S. Application Data

(60) Provisional application No. 62/080,292, filed on Nov. 15, 2014.

(51) Int. Cl.
*B60R 21/239* (2006.01)
*B60R 21/2334* (2011.01)
(Continued)

(52) U.S. Cl.
CPC .......... *B60R 21/239* (2013.01); *B60R 21/233* (2013.01); *B60R 21/2334* (2013.01);
(Continued)

(58) Field of Classification Search
CPC ........................ B60R 21/239; B60R 21/2338; B60R 21/233; B60R 21/2334;
(Continued)

(56) References Cited

U.S. PATENT DOCUMENTS 10,029,645 B2 * 7/2018 Aranzulla ............. B60R 21/239
2001/0000015 A1 * 3/2001 Igawa ................... B60R 21/233
280/740

(Continued)

*Primary Examiner* — Darlene P Condra
(74) *Attorney, Agent, or Firm* — David L. King; Markell Seitzman (57) ABSTRACT

An airbag module comprising an airbag (50) having a passive adaptive vent on a rear panel of the airbag, the vent having a movable vane which when moved causes the vent (200) to change state from open to closed or from closed to open, the airbag further including a main tether (100) secured to a face panel (54) of the airbag, the main tether moving with the face panel, the main tether having an opening (130) into which is threaded a portion of a control tether (80), the control tether is connected to the vane (210) and to the face panel, wherein movement of the end of the control tether in a first direction generally that of the inflating air bag causes the other end of the control tether secured to the vane to be moved in a direction different than the first direction.

17 Claims, 6 Drawing Sheets

(51) Int. Cl.
*B60R 21/233* (2006.01)
*B60R 21/2338* (2011.01)
*B60R 21/203* (2006.01)

(52) U.S. Cl.
CPC ........ *B60R 21/2338* (2013.01); *B60R 21/203* (2013.01); *B60R 2021/2395* (2013.01); *B60R 2021/23382* (2013.01); *B60R 2021/23384* (2013.01)

(58) Field of Classification Search
CPC ........ B60R 2021/23384; B60R 21/203; B60R 2021/23382; B60R 2021/2395
See application file for complete search history.

(56) References Cited

U.S. PATENT DOCUMENTS

| | | | |
|---|---|---|---|
| 2002/0117840 A1* | 8/2002 | Dunkle | B60R 21/231 280/743.2 |
| 2007/0108750 A1 | 5/2007 | Bauer | |
| 2007/0228710 A1* | 10/2007 | Ishiguro | B60R 21/203 280/743.2 |
| 2010/0052297 A1* | 3/2010 | Fukawatase | B60R 21/2338 280/732 |
| 2011/0198828 A1 | 8/2011 | Fischer | |
| 2012/0104734 A1 | 5/2012 | Fischer | |
| 2012/0153603 A1* | 6/2012 | Mallinger | B60R 21/239 280/739 |
| 2013/0221644 A1* | 8/2013 | Beattie | B60R 21/239 280/742 |
| 2015/0028571 A1* | 1/2015 | Polcwiartek | B60R 21/237 280/739 |
| 2015/0375711 A1* | 12/2015 | Umehara | B60R 21/239 280/740 |

* cited by examiner

DRIVER AIRBAG MODULE AND BAG WITH PASSIVELY VENTED CUSHION

BACKGROUND AND SUMMARY OF THE INVENTION

The present invention generally relates to airbags and more particularly to a vented airbag for driver airbag modules.

More particularly the invention related to driver airbag with a passive, adaptive vent. By passive adaptive it is meant the vent does not need any electronics or occupant sensors for activation and by adaptive the performance of the vent is changeable as it interacts with occupants of difference physical stature.

In one respect the invention comprises: an airbag module comprising an airbag having a passive adaptive vent on a rear panel of the airbag, the vent having a movable vane which when moved causes the vent to change state from open to closed or from closed to open, the airbag further including a main tether secured to a face panel of the airbag, the main tether moving with the face panel, the main tether having an opening into which is threaded a portion of a control tether, the control tether is connected to the vane and to the face panel, wherein movement of the end of the control tether in a first direction, generally that of the inflating air bag, causes the other end of the control tether secured to the vane to be moved in a direction different than the first direction.

In another respect the present invention includes, an airbag comprising: a rear panel and a front panel connected to the rear panel to form an inflatable cushion, the front or face panel facing toward the occupant to be protected as the airbag deploys, the rear panel including a first vent hole of fixed size, the rear panel also includes an inlet adapted to receive inflation gas or a gas generator, wherein upon filling of the airbag with inflation gas the front panel moves in a generally first direction;

a passive adjustable valve located on and formed by a portion of the rear panel, the adjustable valve including at least one panel hole in the rear panel and a sliding vane movable relative to the one panel hole and having at least one vane hole and configured to be moved from an initial position in which the vane hole and the panel hole are substantially in alignment or substantially not in alignment with each other, toward a final position in which the vane hole and the panel hole are in substantially the opposite condition;

a cover secured to the rear panel under which the vane slides, the cover including one or more openings aligned with the opening on the rear panel;

a main tether having a first end fixedly connected in the vicinity of the inlet and a second end connected to the front panel, the length of the main tether being shorter than the maximum distance the face can move away to restrict the motion of the face panel;

the main tether having an opening preferably located closer to the first end than the second end;

a vane control tether having a first end, a medial portion and second end, the first end secured to the sliding vane, the medial end extending through the opening on the main tether and the second end secured to one of the main tether or to the front panel, the medial portion extending from the sliding vane to the location of the hole in the main tether so the vane control tether is moved in a second direction substantially different from the first direction to move the sliding vane along the rear panel.

DETAILED DESCRIPTION OF THE DRAWINGS

Figure 1:
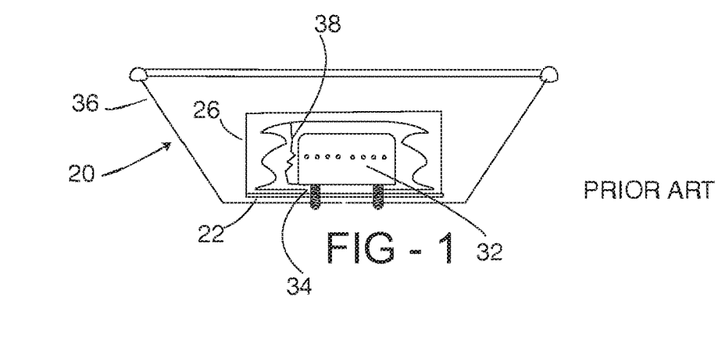
FIG. 1 shows a driver airbag module.

The present invention relates to an improved driver airbag and driver airbag module. FIG. 1 shows the components of a driver airbag module 20 comprising a housing 22, a folded airbag 24 enclosed by a cover 26. An inflator 30, also known as a gas generator 32, is mated with the housing and positioned in an opening 34 of the air bag 24. The module 20 is operatively supported by a steering wheel 36. The forward motion of the inflating airbag is reduced by operation of a tether 38.

Figure 2:
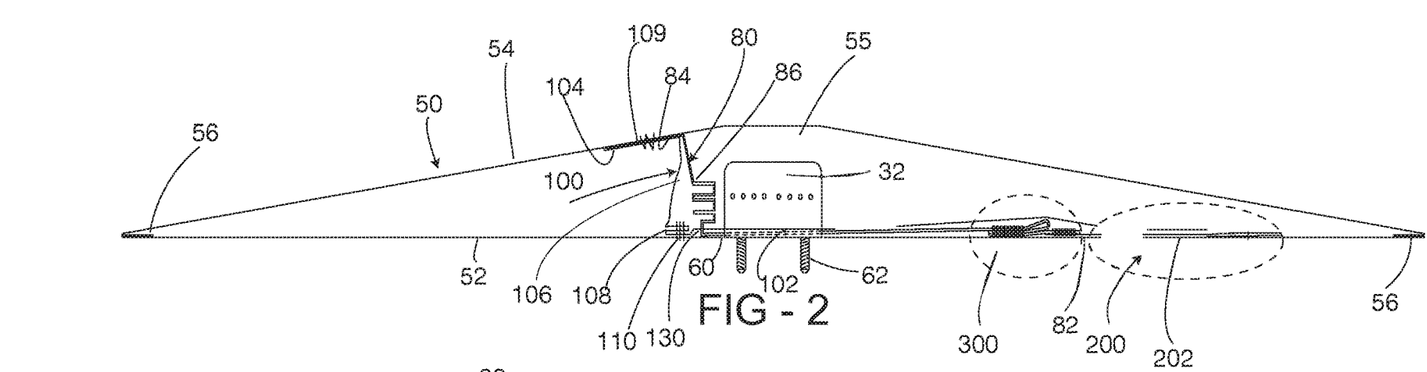
FIG. 2 shows a driver airbag of the present invention in a condition approximating being laid flat on a worktable.

FIG. 2 shows an airbag 50 of the present invention in a configuration approximating as though it were laid out on a worktable. FIG. 2 shows many of the major components of the present invention. Airbag 50 includes a rear panel 52 and face panel 54. The face panel 54 upon inflation of the bag will protect the driver during an accident. The rear and face panels are joined together at the respective peripheries by a joint 56 such as a sewn seam, woven joint or heat weld. The rear panel 52 includes an opening 60 into which can be placed an inflator 32 of known construction. The inflator may include mounting studs 62, only two of which are shown. The inflator is secured to a housing which may be of known construction. The airbag 50 further includes a passive adaptive vent 200, a control tether 80 having a first end 82, a second end 84 and a medial portion 86. By passive adaptive it is meant the vent does not need any electronics or occupant sensors and by adaptive the performance of the vent is changeable as it interacts with occupants of different physical stature. Airbag 50 also has a main tether 100 having a first end 102, a second end 104 and a medial portion 106. End 82 of the control tether is connected to a sliding vane 210 and when tensioned pulls upon the sliding vane 210 of the passage adaptive vent 200. As illustrated end 84 of the control tether and end 104 of the main tether are secured to the front panel 54 at a position offset from the center 55 of the face panel 54 by stitches 109.

Figure 2A:
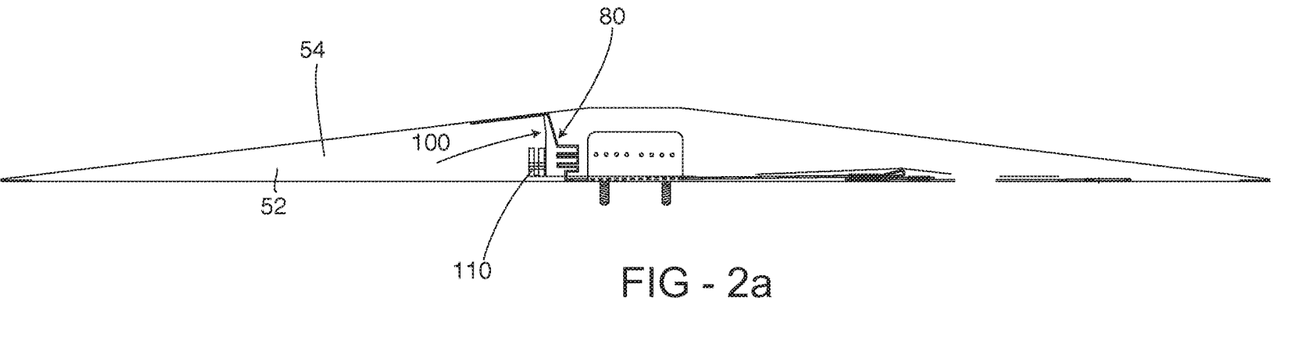
FIGS. 2a and 2b show alternate stitch and pleat patterns useful in securing a main tether.
Figure 2B:
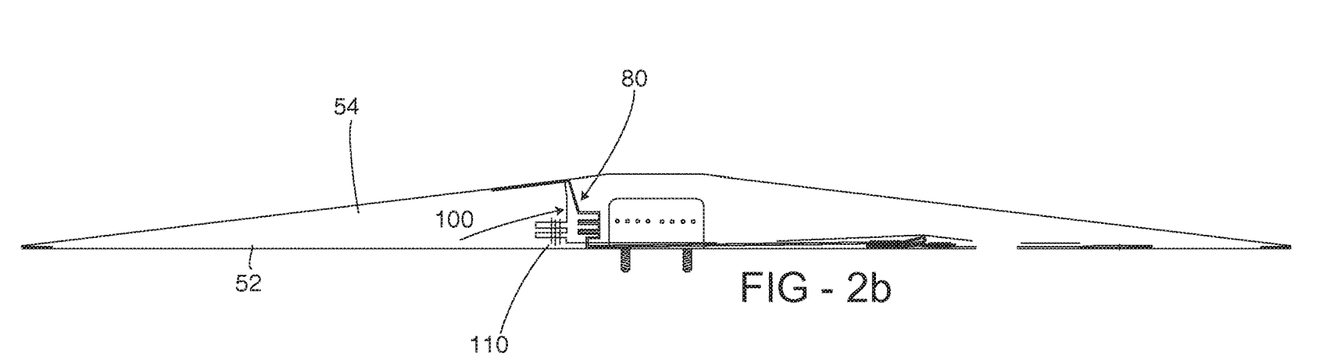

The main tether 100, in its medial portion 106 includes one or more folds or pleats 108 secured together by a breakable seam or set of seams 110; these seams 110 are more clearly shown in FIGS. 8-11. In FIG. 2 and other figures such as FIGS. 2a and 2b, the control tether 80 is shown as being folded; this is for the purpose of illustration. In the present invention the control tether is loosely placed in the airbag and is not purposely folded but it can be. If the control tether were folded, then a tearable seam or similar element would be used to hold the folds together. This tearable seam would rip when the control tether is tensioned at some low level of force.

Figure 9:
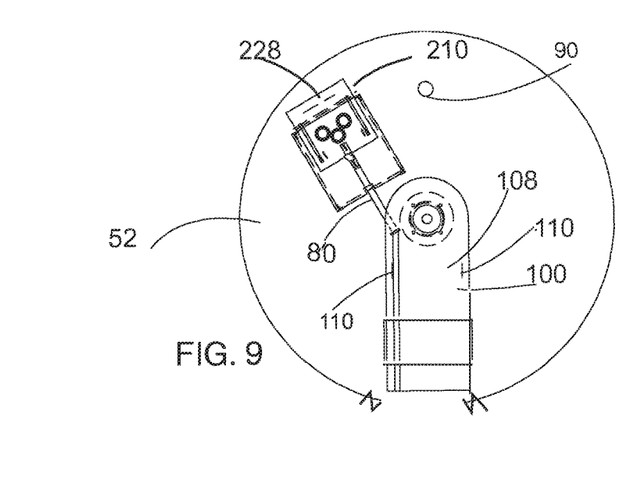
Figure 10:
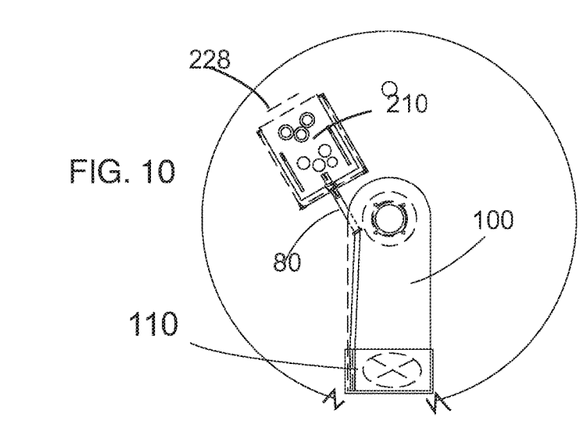
Figure 11:
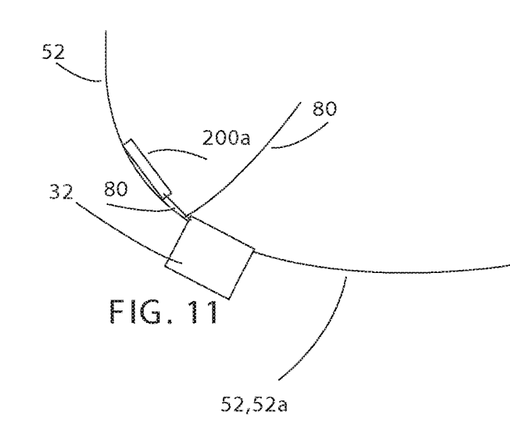
FIG. 11 shows another embodiment of the invention.

The main tether 100 includes a slit or opening 130. The control tether 80 is threaded through this opening 130 as also shown in FIGS. 9-11.

Figure 3:
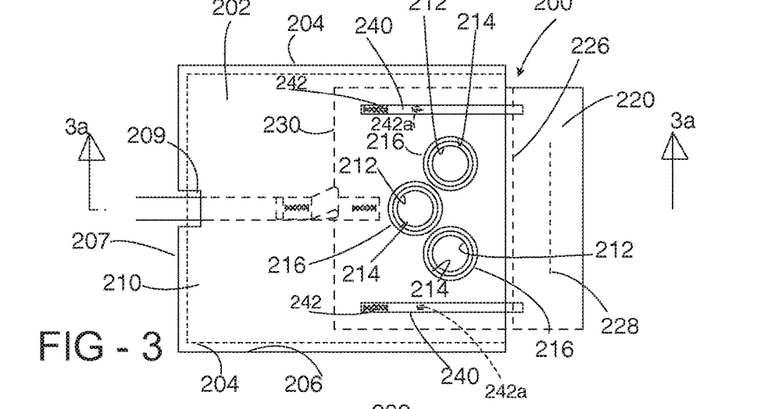
FIGS. 3 and 3a show details of a passive adaptive vent.
Figure 3A:
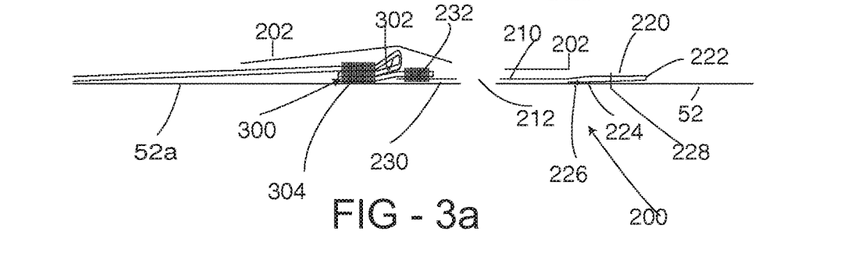
Figure 4:
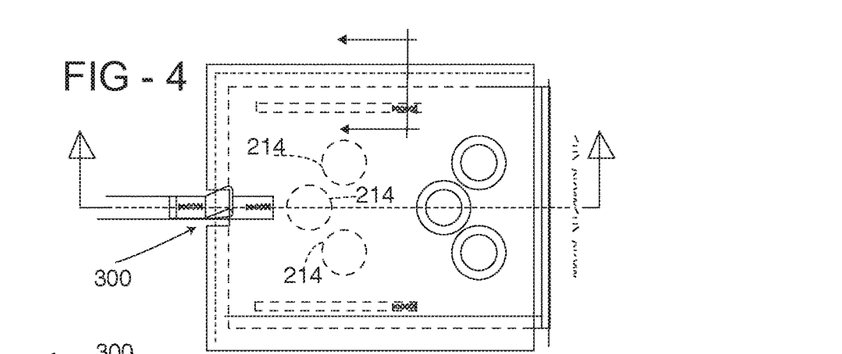
FIGS. 4 and 4a show an adaptive valve in a closed condition.
Figures 4A, 5:
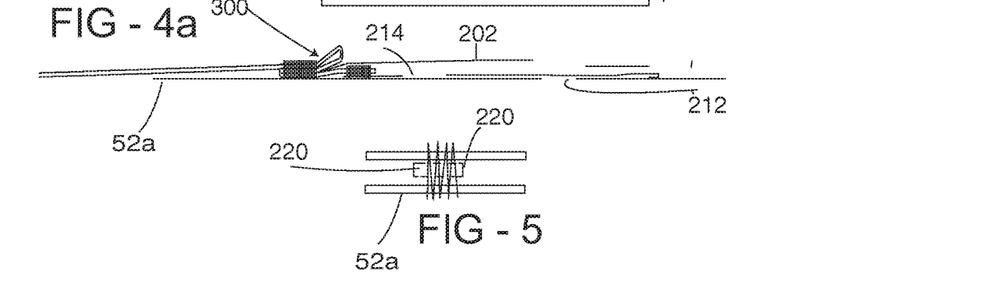
FIG. 5 is a cross-sectional view showing how the vane is guided as it is pulled by a control tether.

With regard to the adaptive vent 200, also see FIGS. 3 through 4a, its major components are a fixed cover 202 sewn to rear panel 52 by a sewn seam 204. The sewn seam 204 is located, at least along sides 206 of the cover 202 and a portion of the front (front side) 207. Front 207 includes an optional notch 209. The vent 200 includes the movable vane 210 which is sandwiched between the cover 202 and a portion 52a of the rear panel 52, which also forms part of the adaptive vent 200. The portion of the rear panel 52a includes one or more openings 212. In the preferred embodiment three such openings 212 are used. The movable vane 210 includes another set of openings 214 and the cover includes a third set of openings 216. FIG. 3 illustrates a normally open adaptive vent 200 in which all three sets of openings 212, 214 and 216 are initially aligned. An alternate configuration of the openings could be rearranged in which the openings are misaligned to yield an initially, normally closed adaptive vent. As can be appreciated the openings can be partially misaligned to yield an initially partially opened or closed vent.

The material forming an end 220 of the movable vane 210 is folded upon itself forming fold 222. The remote end 224 of the vane 210 is secured to the rear panel 52a. In this illustrated embodiment the remote end of the vane is secured by a permanent seam 226. The folded-over part of the vane 210 is temporarily secured in the position shown by a breakable seam 228. This seam 228 maintains the parts of the adaptive vent 200 in the condition illustrated with all of the openings 212, 214, and 216 in alignment even when the airbag is being folded into its compact configuration and also as the airbag begins to inflate. The vent 200 can be made of layers of woven fabric, the same or similar to airbag fabric; other materials such as non-woven plastic sheet can be used as well.

The movable vane 210 has a second end 230. End 82 of the control tether is sewn or otherwise secured to end 230, see stitches 232. The control tether 80 near its end 82 is formed into hook or latch 300 which, as will be seen, prevents the vane from regressing to its initial logic condition after being moved to an opposite logic condition.

Hook or latch 300 includes an extending loop 302 which is secured by a fixed set of stitches 304; these stitches do not extend through to the rear panel 52. As can be seen, the extending loop 302 is formed by folding the control tether twice as illustrated. For example, as mentioned, the vent 200 is designed to be an initially open vent. During inflation of the airbag under certain conditions the control tether 80 is moved to the left in relation to FIGS. 3 and 3a causing the vane 210 to also move to the left. The vane 210 is initially restricted from moving in view of the breakable line of stitches 228 which extends through the vane and at east through the rear panel 52 or 52a. After a sufficient force is applied to the control tether during inflation of the bag, the tearable stitches 228 tear permitting the vane to move. After a sufficient amount of movement of the vane, the openings 214 in the vane are no longer in alignment with the openings in the cover and rear panel. In this condition the valve is now in a closed configuration, shown in FIGS. 4 and 4a, during which time a greater amount of inflation gas is captured within the airbag. The pressure within the bag increases and the bag becomes stiffer to protect the larger occupant. This is especially useful in protecting the larger occupants such as the $50^{th}$ and $95^{th}$ sized occupants. In this manner the vent has automatically adapted to protect the larger occupant. Also at this point, the loop 302 will have been moved to the left of the front side 207 and notch 209 if used. When an airbag is inflated and then loaded by interaction with the occupant to be protected the pressure interior to the bag will increase dramatically, at least for a short time during which some inflation gas is permitted to exit through a fixed sized vent 90. The pressurized inflation gas could move through the various components of the vent. For example some of the pressurized gas could become trapped inside of the folded-over end part of the vane, as shown in FIG. 4 or 4a. This action might cause the movable vane to move rearward toward its initial position. In addition some gas could also cause the vane material to be pushed partially through the openings 212 in the rear panel providing an exit path for the pressurized inflation gas. In essence this return motion of the vane could create an open path through which the pressured inflation gas could exit the airbag, thereby effectively reopening the adaptive vent. This rearward motion of the vent 200 is stopped or prevented as the loop 302 engages the front side 207 of the optional notch 209 forming a catch and limiting the return motion of the vane and insuring the vane stays in a new state of operation. In view of this structure the relationship of the various sets of holes is not permitted to change and the vent stays in a closed condition.

Vane 210 includes two slots 240 that extend longitudinally across the vane material. The vane is guided relative to the cover 202 and the rear panel 52, 52a by introducing a stitch 242 that extends through the cover and rear panel but does not intersect the movable vane 210. As can be seen in FIG. 5 the stitch 242 acts as a post, keeping the vane in proper alignment with the cover and rear panel as the vane is pulled along. Another set of stitches 242a can be introduced through the cover, slot and rear panel. This extra set of stitches is also shown in FIG. 3. If a second set of stitches is used the length of the vane might need to be increased so that it moves the required amount to achieve a closed state.

Figure 6:
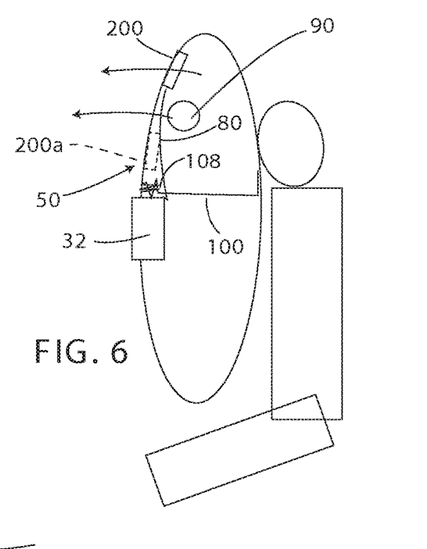
FIGS. 6, 6a and 7, 7a show the interaction of a driver-side airbag with a $5^{th}$ percentile sized occupant and a larger occupant.
Figure 6A:
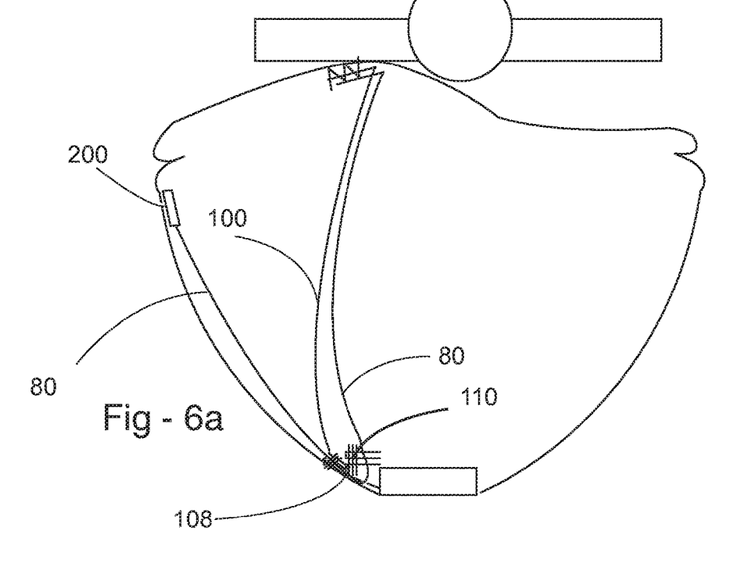
Figure 7:
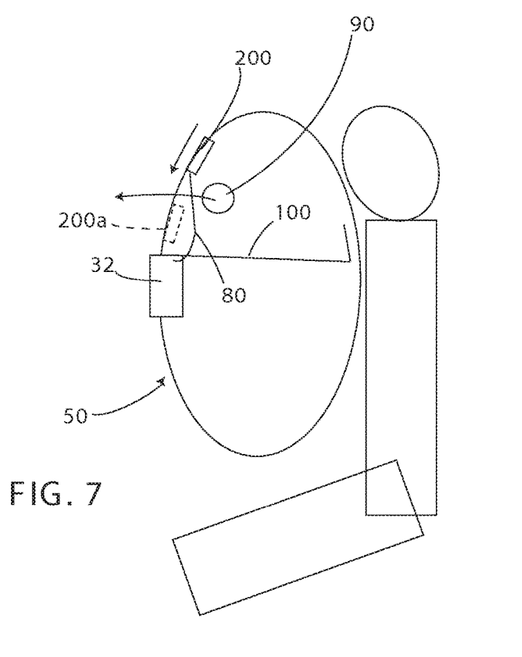
Figure 7A:
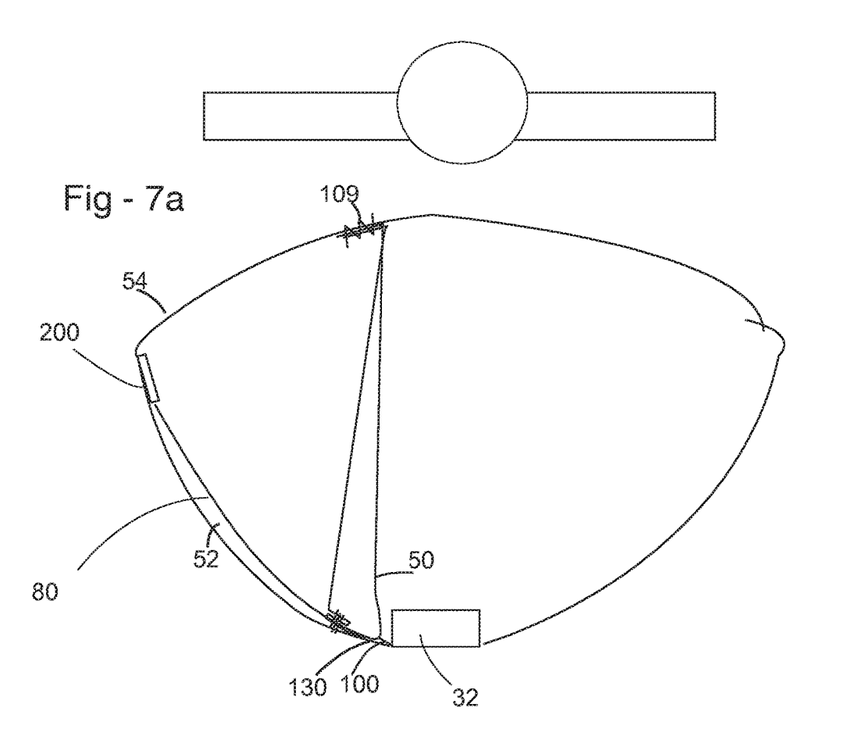
Figure 8:
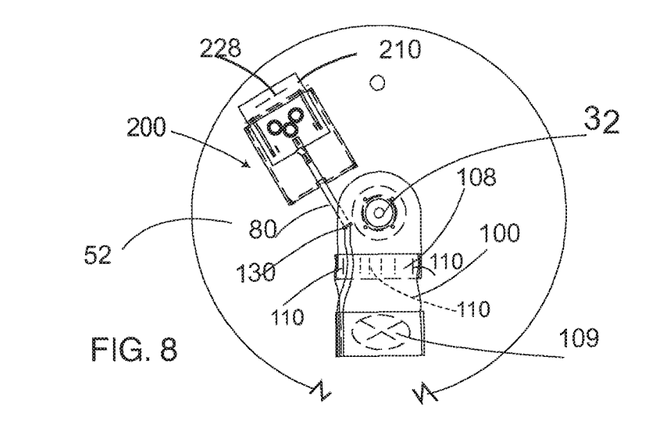
FIGS. 8-10 illustrate the performance of the various parts of the present invention.

Reference is briefly made to FIGS. 6, 6a and 7, 7a which show the interaction of airbag 50 with a 5th percentile sized female in FIGS. 6, 6a and a large sized occupant such as a 50th percentile sized male in FIGS. 7, and 7a. In FIGS. 6 and 6a the airbag has engaged the occupant; in this condition, the stitches 110 of tether 100 remain intact and vent 200 remains in its open position. Inflation gas exits the open vent 200 and also exits a discrete vent 90 located in the rear panel 52. The diameter of vent 90 is sized to provide the proper ride down for the larger sized occupant. In FIGS. 7 and 7a, the larger sized occupant is typically seated further from the steering wheel which is not shown in either of FIG. 6 or 7. Reference is made to the stitches 110 and pleats or fold 108 in FIG. 7a. In FIG. 7a there are two complete loops that are arranged to lie along the rear panel 52. Other configurations of loops are within the scope of the present invention. During the phase of deployment shown in FIG. 7a the bag would become more inflated and the main tether 100 is tensioned. In this condition all of the stitches 110 are in line with the deploying force, and these stitches are designed to be strong enough to hold the tether 100 intact. This inline relationship is shown in FIG. 8 in which a set of stitches 110 is shown in line or longitudinally oriented along the length of the main tether 100 (also in its direction of motion). Also, FIG. 8 shows an additional number of stitches 110 which if used need a larger force to cause these stitches to separate. As more inflation gas enters the airbag, the airbag internal pressure increases and if the occupant has not interacted with the bag and impeded its forward motion, the resulting force on the main tether 100 will be concentrated on the first stitch. As airbag 50 inflates the tear stitches 110 will be broken permitting the main tether 100 to expand and in doing so cause the control tether to become tensioned and pull upon the vane. The vane 210 will move to its closed condition. As the crash continues the larger occupant in FIG. 7 will load airbag 50 and inflation gas will be controllably vented through vent 90 as the vent is closed.

Reference is again made to FIG. 8. FIG. 8 shows the main tether folded and as mentioned above secured by stitches 110. The perspective of FIGS. 8, 9, and 10 has been chosen to illustrate the various elements of the present invention. In these figures the main tether is secured at or near the inflator 32 and its other end 104 is secured at or near the crown of the face panel at location 55 as mentioned above. The control tether is threaded through the opening or slot 130 in the main tether. As previously mentioned one end 82 of the control tether is secured to the vane 210 of the passive adaptive vent 210 and the other end 84 to the face panel at location 55 with the other end 104 of the main tether. In FIG. 8 the sliding vane 210 is secured by the row of stitches 228 which will tear under load. In FIG. 8 the vent 200 is in its open condition. This condition would be similar to that shown in FIG. 2. In FIG. 9 the stitches 110 have broken and the main tether is in the process of being stretched out as the face panel is pushed outward by the inflator gas toward the occupant. The face panel is not shown in FIGS. 8-10. In FIG. 10, the main tether 100 is at its full length as the face panel is moved outward. As the face panel moves it also urges end 84 of the control tether to move with it. In so doing the middle 86 of the control tethers slides through opening or slot 130 and pulls the vane to its closed position. As is evident from FIGS. 8-10 the slot 130 also acts as a direction changing mechanism. As the airbag inflates end 84 of the control tether will generally move outward in the direction of the occupant to be protected. By using the slot 130 in the main panel the motion of end 84 of the control panel is converted into a motion which pulls the vane essentially along the direction of the inflated rear panel. This relationship can also be seen in FIGS. 6, 6a, 7 and 7a.

FIG. 11 shows a partial view of the airbag 50 of the present invention. In this embodiment the adaptive vent shown as 200a is still located on the rear panel 52 but is moved closer to the inflator 32. In this embodiment the control tether placement more closely approximates the contour of the inflator rear panel 52. The main tether is not shown in FIG. 11.

As previously related and as shown in FIG. 8, one of the types of stitches or seams 110 is laid out longitudinally along the direction of extension of the main tether. In the embodiment shown in FIG. 2a the breakable stitch or seam is one or more lines of stitches 110a which run perpendicular to the longitudinal direction of the main tether. When this line of stitches breaks the relative motion of the main tether and control tether will be as described in FIG. 9.

Many changes and modifications in the above-described embodiment of the invention can, of course, be carried out without departing from the scope thereof. Accordingly, that scope is intended to be limited only by the scope of the appended claims.

The invention claimed is:

1. An airbag (50) comprising: a rear panel (52) and a front or face panel (54) connected to the rear panel to form an inflatable cushion, the front or face panel facing toward the occupant to be protected as the airbag deploys, the rear panel including a first vent hole (90) of fixed size, the rear panel also includes an inlet or opening (34) adapted to receive inflation (32) gas or a gas generator, wherein upon filling of the airbag with inflation gas the front or face panel (54) moves in a generally first direction;

an adaptive vent (200) located on and formed by a portion of the rear panel, the adaptive vent including at least one panel hole (212) in the rear panel and a sliding vane (210) movable relative to the one panel hole (212) and having at least one vane hole (214) and configured to be moved from an initial position in which the at least one vane hole (214) and the panel hole (212) are substantially in alignment or substantially not in alignment with each other, toward a final position in which the at least one vane hole (214) and the panel hole (212) are in substantially the opposite condition;

a cover (202) secured to the rear panel under which the sliding vane (210) slides, the cover (202) including one or more openings aligned with the opening on the rear panel (52);

a main tether (100) having a first end (102) fixedly connected in the vicinity of the inlet (34) and a second end (104) connected to the front panel (54), the length of the main tether being shorter than the maximum distance the face can move away to restrict the motion of the front or face panel (54);

the main tether (100) having an opening (130) preferably located closer to the first end than the second end; and a vane control tether (80) having a first end (82), a medial portion (86) and second end (84), the first end secured to the sliding vane (210), the medial end extending through the opening on the main tether (100) and the second end (84) secured to one of the main tether (100) or to the front or face panel (54), the medial portion extending from the sliding vane (210) to the location of the opening (130) in the main tether (100) so the vane control tether (80) is moved in a second direction substantially different from the first direction to move the sliding vane (210) along the rear panel (52), the vane control tether (80) near the first end (82) is formed into a hook or latch (300) configured to prevent the sliding vane (210) from regressing to its initial condition after being moved to an opposite direction, wherein the main tether (100) includes at least one fold or pleat (108), the pleat (108) having two folded sections (108) and wherein the folded sections are secured by a breakable line of stitches or pattern of stitches (110), and wherein the stitches (110) also extend through the rear panel (52).

2. The airbag according to claim 1 wherein the opening (130) in the main tether (100) is located as close to the rear panel (52) as possible.

3. The airbag according to claim 1 wherein the length of the vane control tether (80) is shorter than that of the main tether (100).

4. The airbag according to claim 3 wherein the length of the vane control tether (80) is shorter than or equal to the distance the second end of the sliding vane (210) is moved by the main tether (100) as the airbag inflates.

5. The airbag according to claim 1 wherein the vane control tether (80) includes a "catch" (202, 209) which is configured to interfere with a portion of the sliding vane (210) to prevent the sliding vane (210) from moving back to its initial condition.

6. The airbag according to claim 1 wherein the initial position of the one panel hole (212) relative to the at least one vane hole (214) in the sliding vane (210) are out of alignment.

7. The airbag according to claim 1 wherein the initial position of the one panel hole (212) relative to the at least one vane hole (214) in the sliding vane (210) are in alignment.

8. The airbag according to claim 1 wherein the stitch or pattern of stitches (110) runs generally along a length of the main tether or perpendicular (110a) to the length of the main tether (100).

9. The airbag according to claim 1 wherein the stitch or pattern of stitches (110) runs generally perpendicular to the length of the main tether (100) and wherein a second stitch or second stitch pattern runs in a direction along the length of the main tether (100).

10. The airbag according to claim 1 wherein during filling of the air bag (50) with inflation gas the front panel (54) moves in the first direction urging the second end (104) of the main tether (100) and the second end (84) and a first portion (82) of the medial portion (86) of the vane control tether (80) to also move in this first direction; wherein motion of the first portion (82) of the medial tether (86) pulls at the first end (82) the sliding vane (210) in substantially the second direction to change the physical state of the sliding vane (210) from open to closed or from closed to open.

11. The airbag according to claim 1 wherein the hook or latch (300) includes an extending loop (302) secured by a first set of stitches (304), the first set of stitches do not extend through to the rear panel (52).

12. The airbag according to claim 11 wherein the extending loop (302) is formed by folding the vane control tether (80) twice.

13. A driver airbag module having an airbag (50) configured to be inflated, the airbag including:
   a rear panel (52) and a front or face panel (54) connected to the rear panel (52) to form an airbag cushion;
   an adaptive vent (200) located on a portion of a rear panel (52a), the adaptive vent (200) including at least one panel hole (212) shared with and located in a portion of the rear panel (52a) and a sliding vane (210) movable relative to the rear panel (52), the sliding vane (210) having at least one vane hole (214) and configured to be moved from an initial position in which the at least one vane hole (214) and the panel hole (212) are substantially in alignment or substantially not in alignment with each other, toward a fixed position in which the at least one vane hole (214) and the panel hole (212) are in substantially the reverse conditions;
   a main tether (100) having a first end (102) generally fixedly connected in the vicinity of the inlet (34) and a second end (104) connected to the front or face panel (54), the length of the main tether (100) being shorter than the maximum distance the front or face panel (54) can move as it inflates;
   the main tether (100) having an opening (130) located closer to the first end (102) than the second end (104);
   a vane control tether (80) having a first end (82), a medial portion (86) and second end (84), the first end secured to the sliding vane (210) of the adaptive vent (200), the medial portion (86) slidingly extending through the opening (130) in the main tether (100) and the second end (84) secured to one of the main tether (100) or to the front or face panel (54), the medial portion extending from the sliding vane (210) to the front or face panel (54) so that as the main tether (100) extends the vane control tether (80) is moved a second direction substantially different from the first direction to move the sliding vane (210), the vane control tether (80) near the first end (82) is formed into a hook or latch (300) configured to prevent the sliding vane (210) from regressing to its initial condition after being moved to an opposite direction, wherein the main tether (100) includes at least one fold or pleat (108), the pleat (108) having two folded sections (108) and wherein the folded sections are secured by a breakable line of stitches or pattern of stitches (110), and wherein the stitches (110) also extend through the rear panel (52).

14. The airbag according to claim 13 wherein the hook or latch (300) includes an extending loop (302) secured by a first set of stitches (304), the first set of stitches do not extend through to the rear panel (52).

15. The airbag according to claim 14 wherein the extending loop (302) is formed by folding the vane control tether (80) twice.

16. An airbag module comprising an airbag (50) having a passive adaptive vent (200) on a rear panel (52) of the airbag, the vent having a sliding vane (210) which when moved causes the vent to change state from open to closed or from closed to open, the airbag further including a main tether (100) secured to a front or face panel (54) of the airbag, the main tether moving with the front or face panel, the main tether having an opening (130) into which is threaded a portion of a vane control tether (80), the vane control tether is connected to the sliding vane (210) and to the front or face panel, wherein movement of the end (84) of the vane control tether (80) in a first direction generally that of the inflating air bag causes the other end (82) of the vane control tether (80) secured to the sliding vane (210) to be moved in a direction different than the first direction, the vane control tether (80) near the first end (82) is formed into a hook or latch (300) configured to prevent the sliding vane (210) from regressing to its initial condition after being moved to an opposite direction, wherein the main tether (100) includes at least one fold or pleat (108), the pleat (108) having two folded sections (108) and wherein the folded sections are secured by a breakable line of stitches or pattern of stitches (110), and wherein the stitches (110) also extend through the rear panel (52).

17. The airbag according to claim 16 wherein the hook or latch (300) includes an extending loop (302) secured by a first set of stitches (304), the first set of stitches do not extend through to the rear panel (52).

* * * * *